(12) United States Patent
Shaw et al.

(10) Patent No.: US 7,971,154 B2
(45) Date of Patent: Jun. 28, 2011

(54) TEXT BOX NUMBERING AND LINKING VISUAL AIDS

(75) Inventors: Han-Yi Shaw, Redmond, WA (US); Brent M. Lang, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 11/356,328

(22) Filed: Feb. 16, 2006

(65) Prior Publication Data

US 2010/0011308 A1 Jan. 14, 2010

(51) Int. Cl.
G06F 3/048 (2006.01)

(52) U.S. Cl. ........ 715/805; 715/809; 715/780; 715/762; 715/763

(58) Field of Classification Search .................... 715/805
See application file for complete search history.

(56) References Cited

U.S. PATENT DOCUMENTS

| | | | | |
|---|---|---|---|---|
| 5,673,401 | A | * | 9/1997 | Volk et al. ...................... 725/139 |
| 5,675,753 | A | * | 10/1997 | Hansen et al. ................. 715/744 |
| 5,832,494 | A | * | 11/1998 | Egger et al. .................... 707/102 |
| 7,225,405 | B1 | * | 5/2007 | Barrus et al. .................. 715/716 |
| 2002/0105547 | A1 | * | 8/2002 | Marchionda et al. .......... 345/763 |
| 2002/0140731 | A1 | * | 10/2002 | Subramaniam et al. ...... 345/762 |
| 2005/0055639 | A1 | * | 3/2005 | Fogg .............................. 715/535 |

FOREIGN PATENT DOCUMENTS

WO 2004059454 A2 7/2004

OTHER PUBLICATIONS

International Search Report dated Jun. 22, 2007 in PCT Application No. PCT/US2007/000626.
European Search Report dated Jul. 30, 2010 in European Application No. 07716486.1.
B. Heslop et al., "Microsoft Office Word 2003 Bible", Oct. 2003, XP002592593, ISBN:0-7645-3971-X, pp. 480-485.
Han-Yi Shaw, "Welcome to Word Publishing Layout View", Oct. 11, 2007, XP002592594, Retrieved from the Internet: URL:http://www.officeformac.com/blog/welcome-to-word-publishing-layout-view [retrieved on Jul. 20, 2010].
Office Action dated Jun. 4, 2010 in Chinese Application No. 200780005936.1.
Response to Office Action filed Oct. 19, 2010 in Chinese Application No. 200780005936.1.
Office Action dated Jan. 28, 2011 in Russian Application No. 2008133614.
Response to Office Action filed Mar. 30, 2011 in Russian Application No. 2008133614.

* cited by examiner

*Primary Examiner* — Dennis-Doon Chow
*Assistant Examiner* — Anil N Kumar
(74) *Attorney, Agent, or Firm* — Vierra Magen Marcus & DeNiro LLP

(57) ABSTRACT

A graphical user interface is disclosed for tracking and managing the use of text boxes by providing visual aids that make it easy for a user to see which text boxes are linked to which, as well as the order of text boxes in a linked chain. The present system also makes it easy to track the creation and breaking of linked text box chains.

13 Claims, 16 Drawing Sheets

TEXT BOX NUMBERING AND LINKING VISUAL AIDS

BACKGROUND

1. Field of the Present System

The present system is directed to a graphical user interface allowing users to interface with a computer operating system and/or application programs running in conjunction with the operating system.

2. Description of the Related Art

Computer operating systems frequently employ a graphical user interface ("GUI") to convey information to users over a display by various combinations of graphical items, such as icons, text, drop-down menus, dialog boxes, and toolbars. A GUI provides an interface to the operating system, and to application programs running in conjunction with the operating system. The goal of most user interfaces is to provide a rich user experience where the user can quickly and easily access a wide variety of operating system and/or application program functions.

Certain application programs, such as for example word processing and desk top publishing application programs, treat elements of content including text and/or graphics as content objects. One type of content object is a text box. The text box is treated as a graphic object by the application program, but can contain text that may be easily sized and positioned for example to frame inserted objects such as diagrams, flowcharts and schematics. A known feature of text boxes is that they may be linked together in a chain. Where a first text box is linked to a second text box, any text not fitting within the second text box as sized will automatically "spill over" into and populate the first text box. Linked text box chains of any desired length may be formed, with text from upstream text boxes spilling over into the downstream text boxes in the sequential order in which the text boxes are linked.

At present, text boxes do not include useful notation or visual aids for showing which text boxes are linked to which, nor do they provide a useful indication of the order in which text boxes are linked. Moreover, existing linked text box chains may be broken and new ones are formed. However, when forming and breaking text box links, it is often difficult to know which text boxes are part of the chain being formed or broken. Without a system of effective visual aids, the use of text boxes and text box chains may become confusing and difficult to manage.

SUMMARY

The present system, roughly described, relates to a graphical user interface for tracking and managing the use of text boxes by providing visual aids that make it easy for a user to see which text boxes are linked to which, as well as the order of text boxes in a linked chain. The present system also makes it easy to track the creation and breaking of linked text box chains.

In one aspect of the present system, during a linking operation, target text boxes which are available for linking may pulsate when hovered over to allow the user to quickly and easily discern available text boxes for the linking operation. When the user clicks on the desired valid target text box to create a link, the target text box and all other text boxes in the chain may pulsate or flash, thereby indicating that a link has been established. The pulsating linked text boxes also allow the user to see all the text boxes on the GUI that are part of this linked text box chain. Similarly, when a linked text box chain is broken, the former chain may pulsate on the GUI to indicate that a chain has been broken and which text boxes were part of this broken chain.

In a further aspect of the present system, all text boxes linked in a single chain may be assigned a common visual linking aid. In embodiments, the visual linking aid may be a particular color assigned to the border of each text box in the chain. No two text box chains are provided with the same visual linking aid. When the screen cursor hovers over a text box, the visual linking aid for that text box becomes visible, allowing a user to quickly and easily determine to which chain, if any, the text box belongs.

In a further aspect of the present system, numeric indicators may also be assigned sequentially to each stand alone text box and text box in a linked text box chain. When hovering over a text box, its assigned numeric indicator may be displayed in a sequence badge appearing on the border of the text box or elsewhere. Thus, in addition to knowing which text boxes belong or do not belong to a linked text box chain, the user may also quickly discern the order of the text boxes within the linked text box chain.

The visual linking aids and the numeric indicators are transient. That is, when a text box is linked to another text box or text box chain, its visual linking aid may change to that of the new text box or text box chain. Similarly, when a text box is linked to another text box or text box chain, its numeric identifier may change to indicate its relative position in the newly formed linked text box chain. Thus, a user may continuously track and manage text boxes as text boxes are added and deleted, and linked text box chains are formed and broken.

DETAILED DESCRIPTION

The present system will now be described with reference to FIGS. 1 through 16, which in embodiments relate to a GUI allowing users to interface with a computer operating system and/or application programs running in conjunction with the operating system. The present system may operate over a wide variety of operating systems using user interfaces, including for example the Macintosh operating system by Apple Computer, Inc., the Windows® operating system from Microsoft Corporation, and the Linux operating system.

Figure 1:
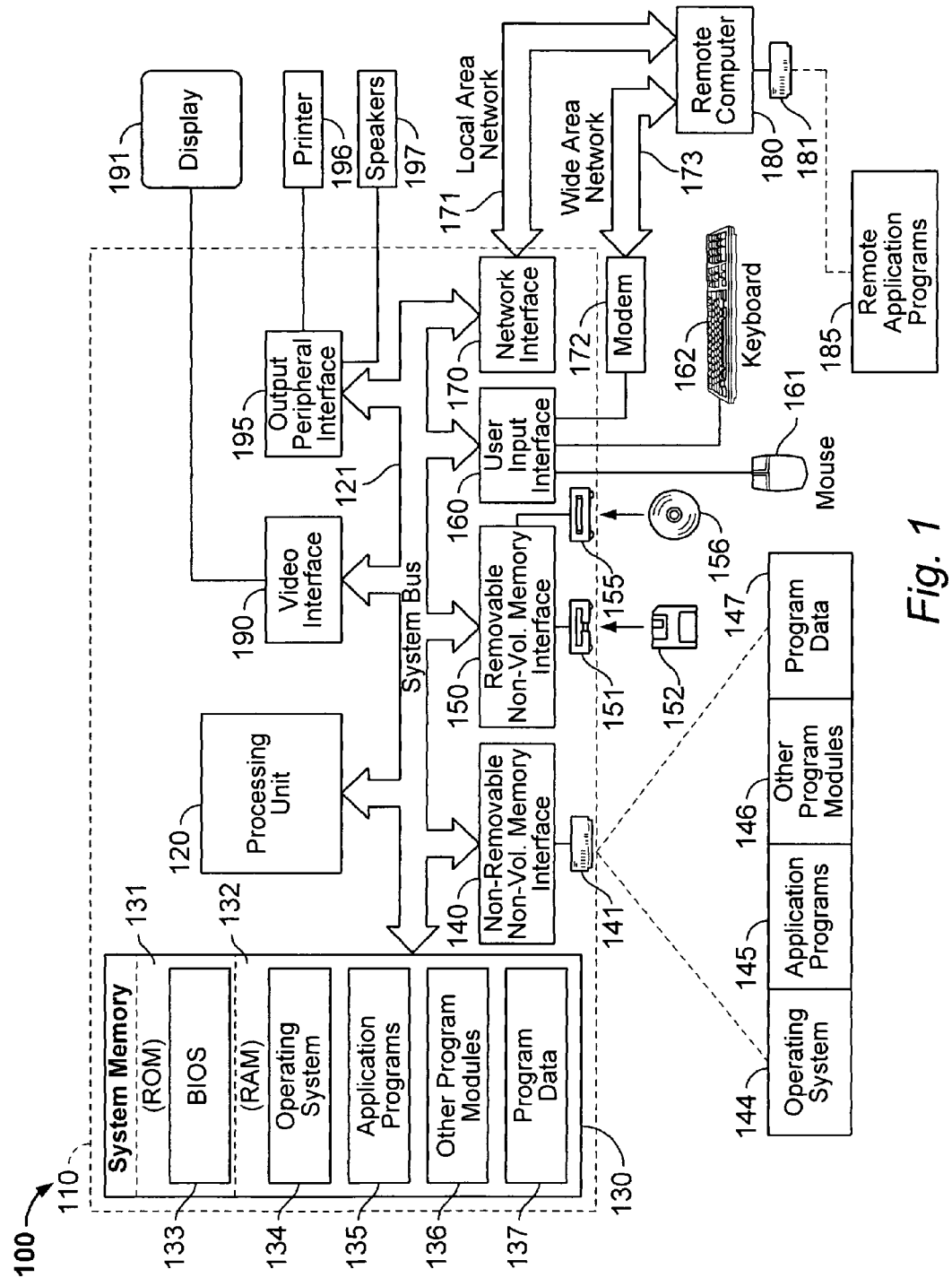
FIG. 1 is a block diagram of a computer hardware for implementing embodiments of the present system.

The GUI described herein can be implemented on a variety of processing systems. FIG. 1 illustrates an example of a suitable general computing system environment 100 on which the present system may be implemented. The computing system environment 100 is only one example of a suitable computing environment and is not intended to suggest any limitation as to the scope of use or functionality of the system. Neither should the computing system environment 100 be interpreted as having any dependency or requirement relating to any one or combination of components illustrated in the exemplary computing system environment 100.

The present system is operational with numerous other general purpose or special purpose computing systems, environments or configurations. Examples of well known computing systems, environments and/or configurations that may be suitable for use with the present system include, but are not limited to, personal computers, server computers, multiprocessor systems, microprocessor-based systems, set top boxes, programmable consumer electronics, network PCs, minicomputers, mainframe computers, laptop and palm computers, hand held devices including personal digital assistants and mobile telephones, distributed computing environments that include any of the above systems or devices, and the like.

The present system may be described in the general context of computer-executable instructions, such as program modules, being executed by a computer. Generally, program modules include routines, programs, objects, components, data structures, etc., that perform particular tasks or implement particular abstract data types. The present system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), electrically erasable programmable read-only memory (EEPROM), flash memory or other memory technology, CD-ROM, digital versatile disks (DVD) or other optical disk storage, magnetic cassettes, magnetic tapes, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The application programs 135 stored in system memory 130 may include the GUI for performing the present system as described hereinafter. When one of the application programs including the GUI of the present system is launched, it runs on the operating system 134 while executing on the processing unit 120. An example of an operating system on which the application programs including the present GUI may run is the Macintosh operating system by Apple Computer, Inc., but the application programs including the present GUI may operate on a variety of operating systems including also the Windows® operating system from Microsoft Corporation, or the Linux operating system. The application programs including the present GUI may be loaded into the memory 130 from the CD-ROM drive 155, or alternatively, downloaded from over network 171 or network 173.

The present system will now be described in reference to the flowcharts of FIGS. 2A through 8, and sample screen depictions of FIGS. 9 through 16. It is understood that the term "text box" as used herein is not limited to a graphical object in which text is provided, but instead may refer to a broader range of graphical, linkable objects which may include text, graphics or other content. It is understood that the software of the present system may provide a user interface which may be contextually adjusted for a variety of application programs, e.g., word processing, presentation, spreadsheet, drawing, and/or other application program types.

The text box functionality may be launched at step 200 (FIG. 2A) by clicking a link from a toolbar, drop-down menu and/or palette appearing on the GUI window of the application program. Once launched, the software of the present system allows the user to perform various operations in conjunction with text boxes, including: 1) adding text boxes; 2) adding text to a text box; 3) formatting the appearance of a text box; 4) hovering over a text box; 5) linking text boxes together; 6) unlinking, or breaking, previously linked text boxes; and/or 7) deleting text boxes. The present system provides an enhanced user experience when performing some or all of these text box operations by providing visual aids in the form of colors and numbers to make it easier to track and manage text boxes.

Upon launching the text box functionality, if there are no text boxes (step 202), the user first creates a text box in step 204. The operation for creating a text box is explained with reference to the flowchart of FIG. 3 and the screen depiction shown in FIG. 9. A text box 402 may be created from a tool bar, drop-down menu and/or palette appearing on GUI 400 of the application program. The text box 402 may be created in a known manner, and the size and the aspect ratio may be user defined on GUI 400 in a known manner.

In step 210, the software of the present system assigns a numeric identifier to text box 402, which numeric identifier may be stored in RAM or other memory. The numeric identifier is used to keep track of the number of text boxes in a linked text box chain, and also keeps track of the relative position of the text box within the chain. For example, in a chain of three linked text boxes, the numeric identifier for the first box in the chain may be "1," the numeric identifier for the second box may be "2," and the numeric identifier for the third text box may be "3." Similarly the first text box in a plurality of different linked text box chains may each have a numeric identifier of 1. It is understood that other sequential identifiers may be used. For example, a first text box in a linked chain may be assigned the letter "A," the second text box in a linked chain may be assigned the letter "B," etc. In accordance with embodiments of the present system, the numeric identifier may also be displayed in a sequence badge on the GUI as explained hereinafter.

In step 212, the software of the present system additionally assigns a unique visual linking aid to text box 402 and the text box 402 is displayed with the visual linking aid in steps 214. In embodiments, any text box which is thereafter linked to text box 402 will be assigned the same visual linking aid. The visual linking aid may be considered unique in that no two text boxes on GUI 400 that are not linked together have the same visual linking aid.

In the embodiments described hereinafter, the visual linking aid is a color in which the border of a text box is displayed on GUI 400. Thus, separate text boxes or linked text box chains may each have a different colored border, such as blue, red, green, purple, orange, etc. However, it is understood that the visual linking aid used to distinguish a text box or linked text box chain may be other than a colored border in alternative embodiments. The visual linking aid may for example be a colored background within the text box, or a patterned border or background of the text box.

As is known in the art, the border of a text box may change its appearance depending on whether it is in typing mode or format mode. For example, when in typing mode, the text box border may be diagonal lines, whereas when in format mode, the text box borders may be herringbone lines. It is understood that the text box may include the visual identifier when in either typing mode or format mode. Referring again to FIG. 2A, in step 220, when a user uses a mouse or other user interface selection device to place the screen cursor within the text box and clicking, the software may operate in a typing mode and may accept and display text (step 222). In step 224, the text box may be placed in format mode by clicking on the border of the text box. When in format mode, the text box may be resized and displayed in step 226. Other known formatting options may be applied to a text box as well in step 226, such as formatting the appearance of the text box and text box border.

Figure 4:
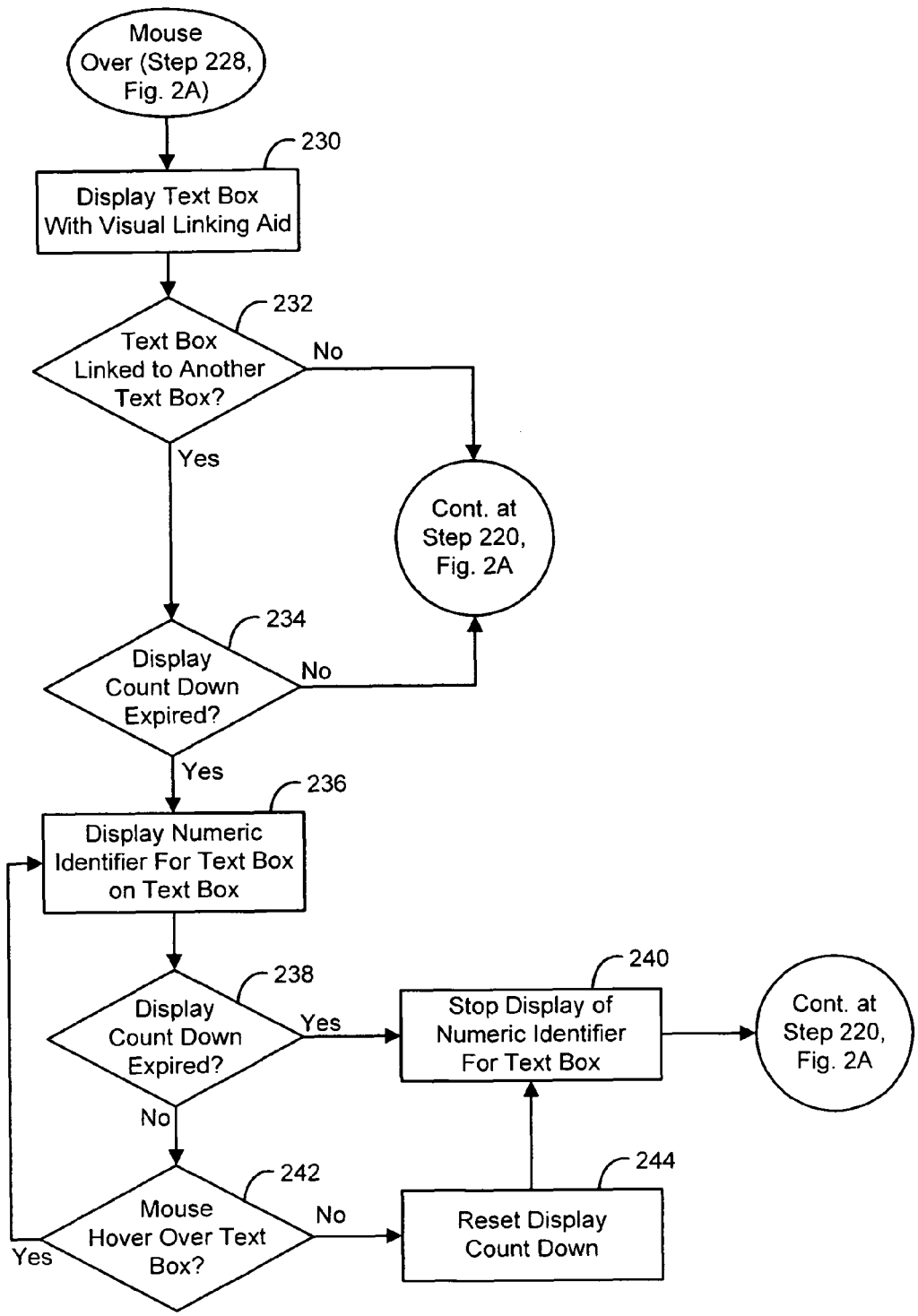
FIG. 4 is a flowchart for displaying numeric indicators and visual aids when hovering over text boxes according to the present system.

Another text box operation which may be performed is a mouse hover operation, where the mouse or other user interface selection device positions the screen cursor over a text box. In accordance with an embodiment of the present system, when a mouse hover occurs (step 228, FIG. 2A), the system performs steps 230-244 as shown in FIG. 4 and the screen depictions shown in FIGS. 10-14.

Figure 10:
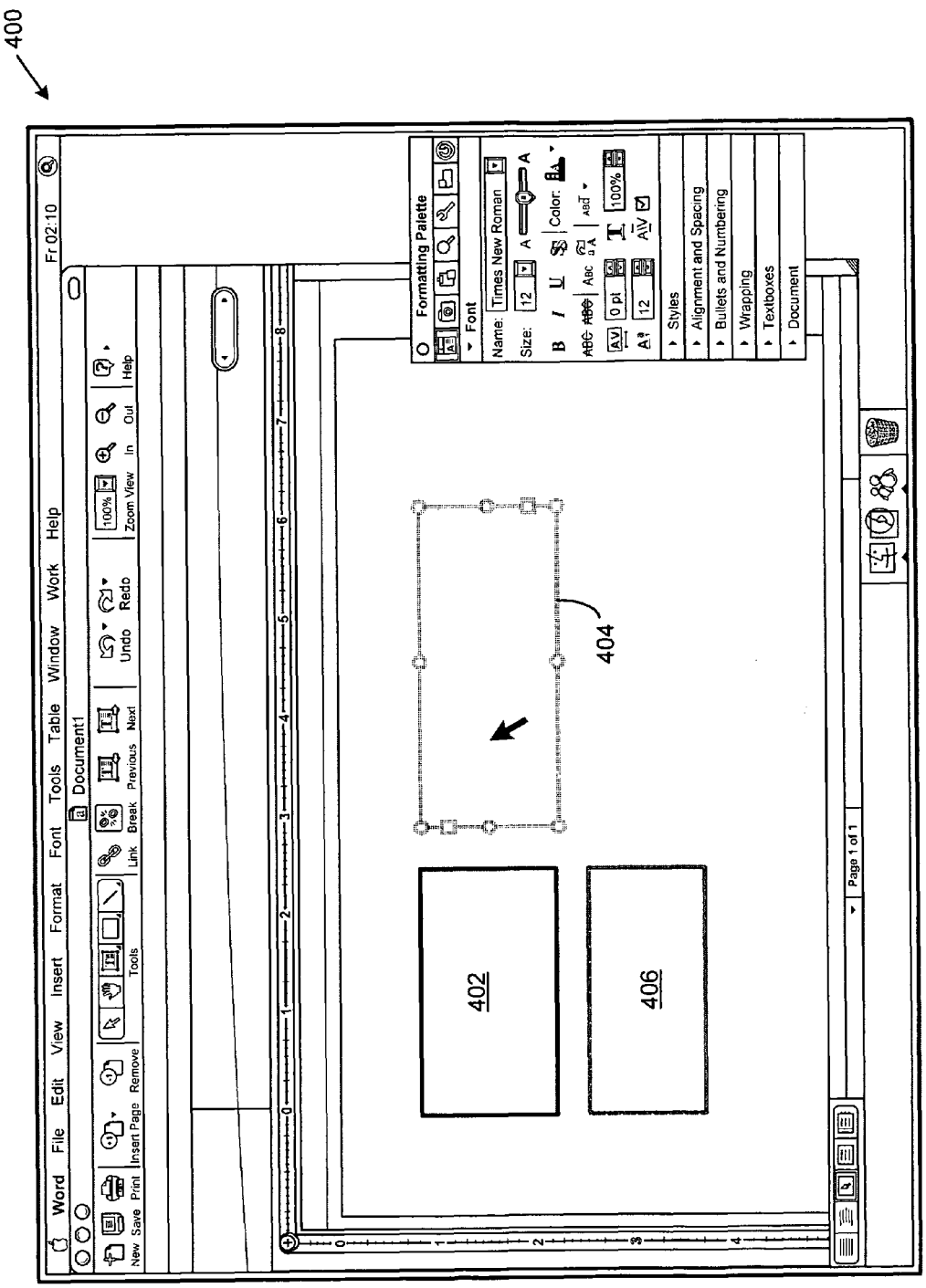
Figure 11:
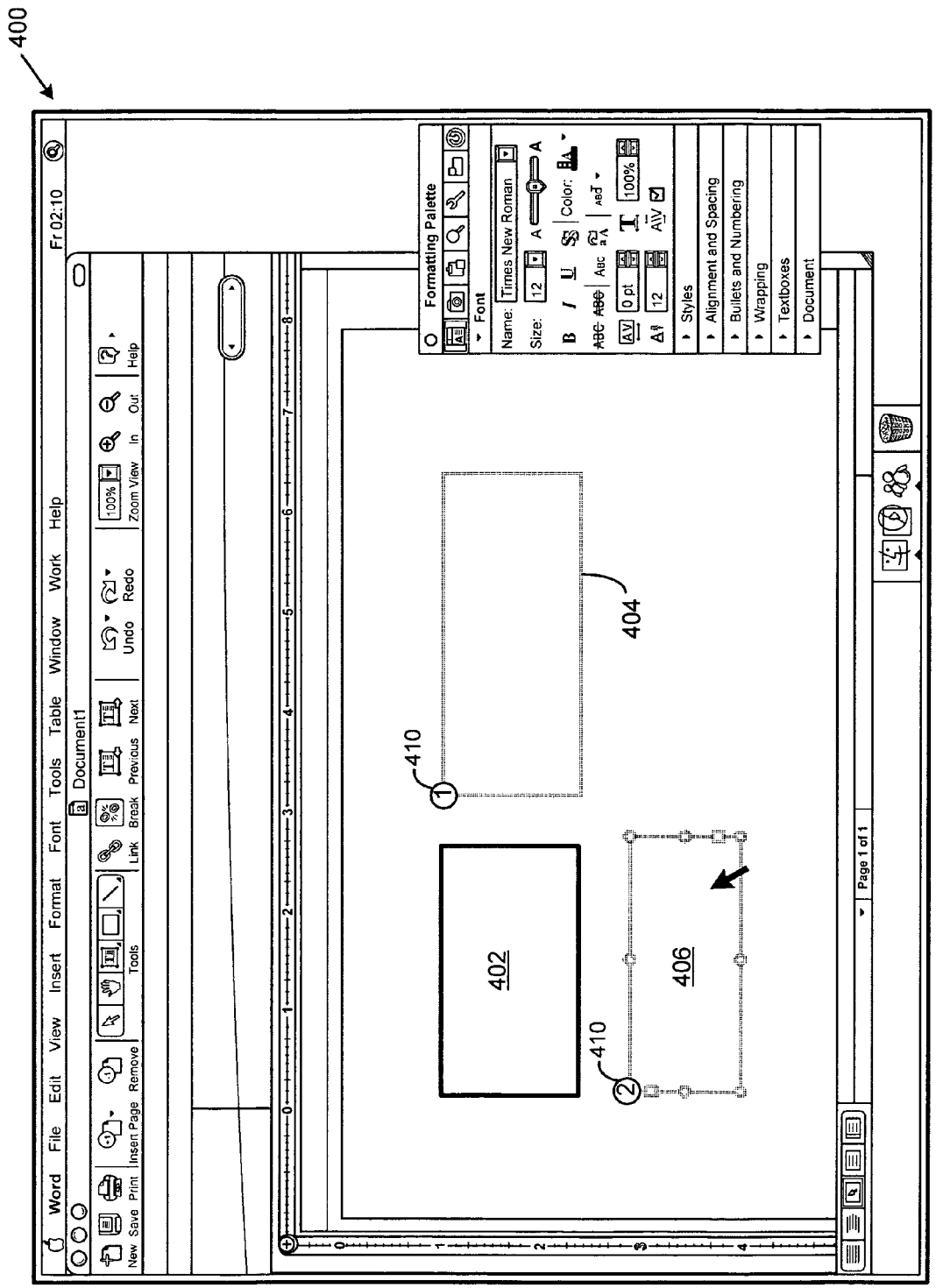

FIG. 10 illustrates the creation of two additional text boxes, 404 and 406 on GUI 400, with sample text being shown in text box 404. Each of the text boxes 402, 404 and 406 has a different visual linking aid (i.e., colored border) indicating that none of the text boxes is linked to each other (these different colors are represented in FIGS. 9-16 by different shades of gray on the borders around text boxes 402 through 406). FIG. 11 illustrates text box 406 having been linked to text box 404 (the linking operation is discussed in greater detail below).

Figure 12:
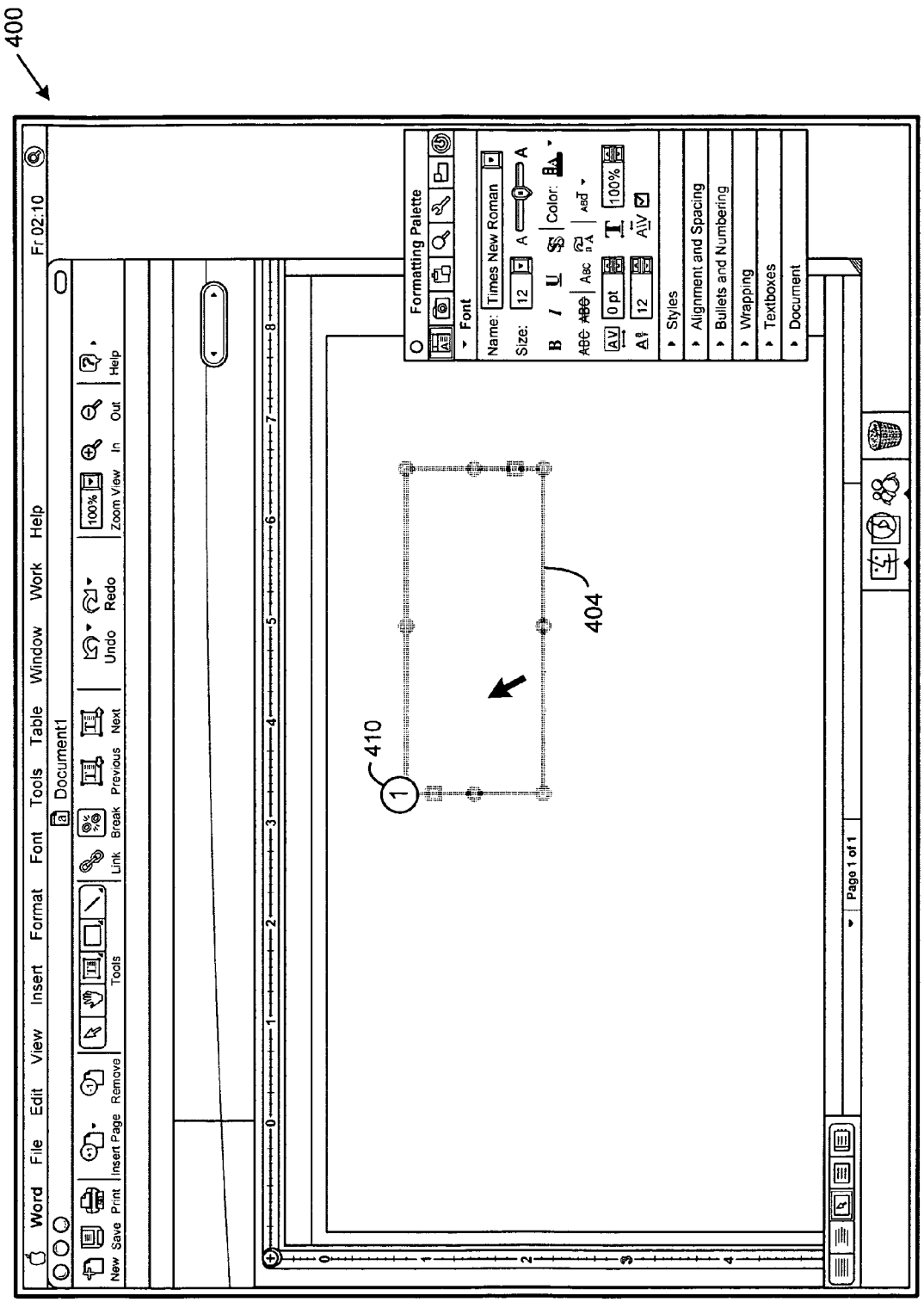
Figure 13:
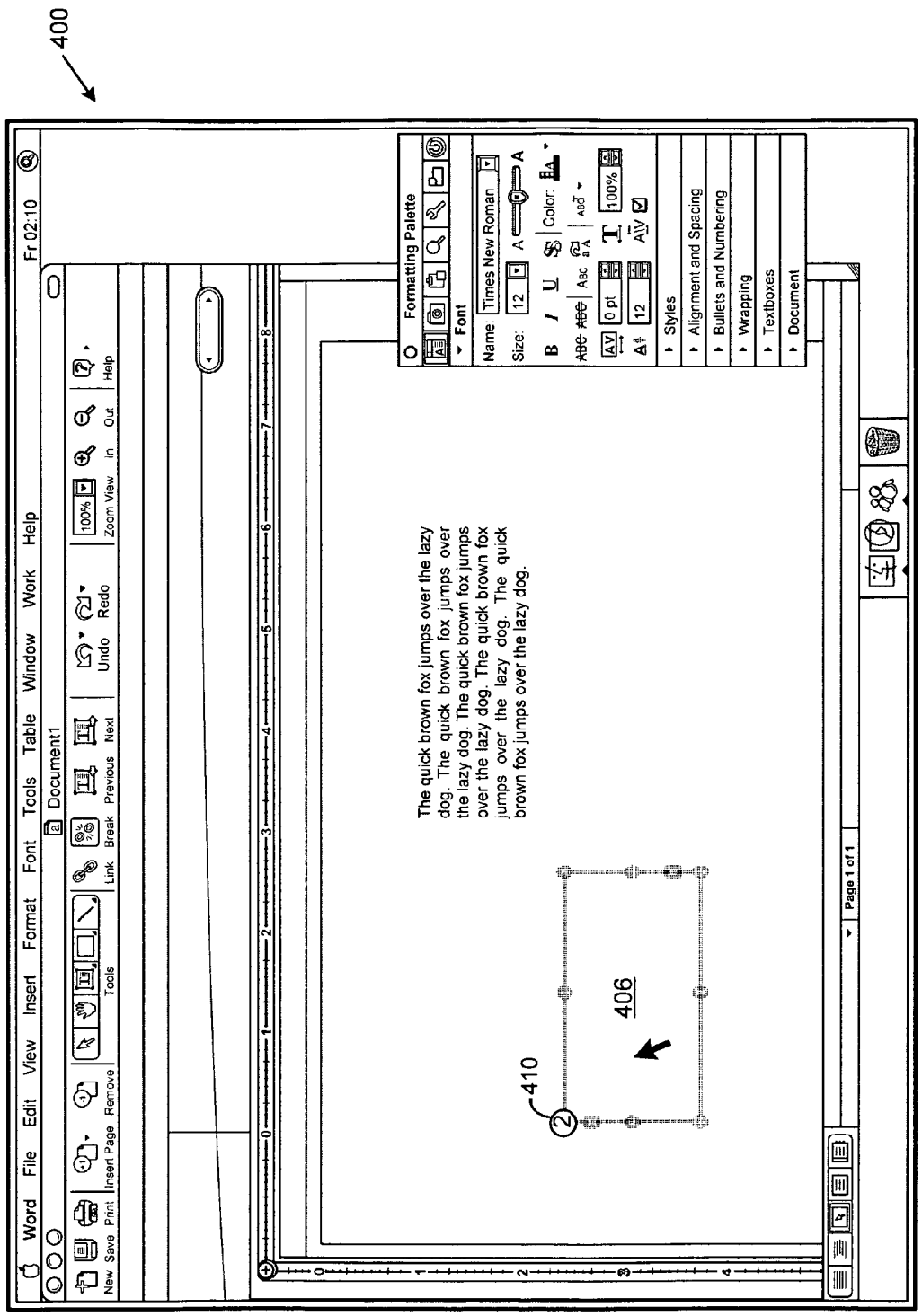

In accordance with a further aspect of the present system, when the cursor hovers over a text box that is part of a linked chain, in addition to the visual linking aid, the numeric identifier may be displayed within a sequence badge 410 as shown on linked text boxes 404 and 406 in FIGS. 11 through 13. The numeric indicator within the sequence badge visually indicates on GUI 400 the relative position of that text box within its text box chain. Thus, the number "2" in sequence badge 410 on text box 406 indicates that it is the second text box in the linked chain of text boxes 404 and 406, and that any text not fitting within text box 404 will spill over into text box 406. It is understood that any number of text boxes may be linked together, with the relative position of the text boxes in the chain being indicated within sequence badges 410 for each text box.

The sequence badge 410 is shown as being a circle in the corner of the border of a text box. It is understood that the sequence badge may have other shapes, and be displayed at other locations around the border of a text box, within the interior of a text box, or outside of a text box. The numeric indicator and the sequence badge may be displayed in the same color as the visual linking aid for that text box, but need not be the same color as the visual linking aid in alternative embodiments.

In FIG. 11, the visual linking aid and any sequence badge is visible for each text box, even where the screen cursor is not positioned thereover. This is for ease of understanding of the present system. However, in alternative embodiments, it is contemplated that the visual linking aids and any sequence badge for each text box may in fact be visible on GUI 400 even when the screen cursor is not positioned thereover. The software may provide an icon or button on a toolbar, drop down menu or palette, which, when selected, activates a mode where all text box visual linking aids and sequence badges are displayed on GUI 400, regardless of the position of the screen cursor.

Figure 14:
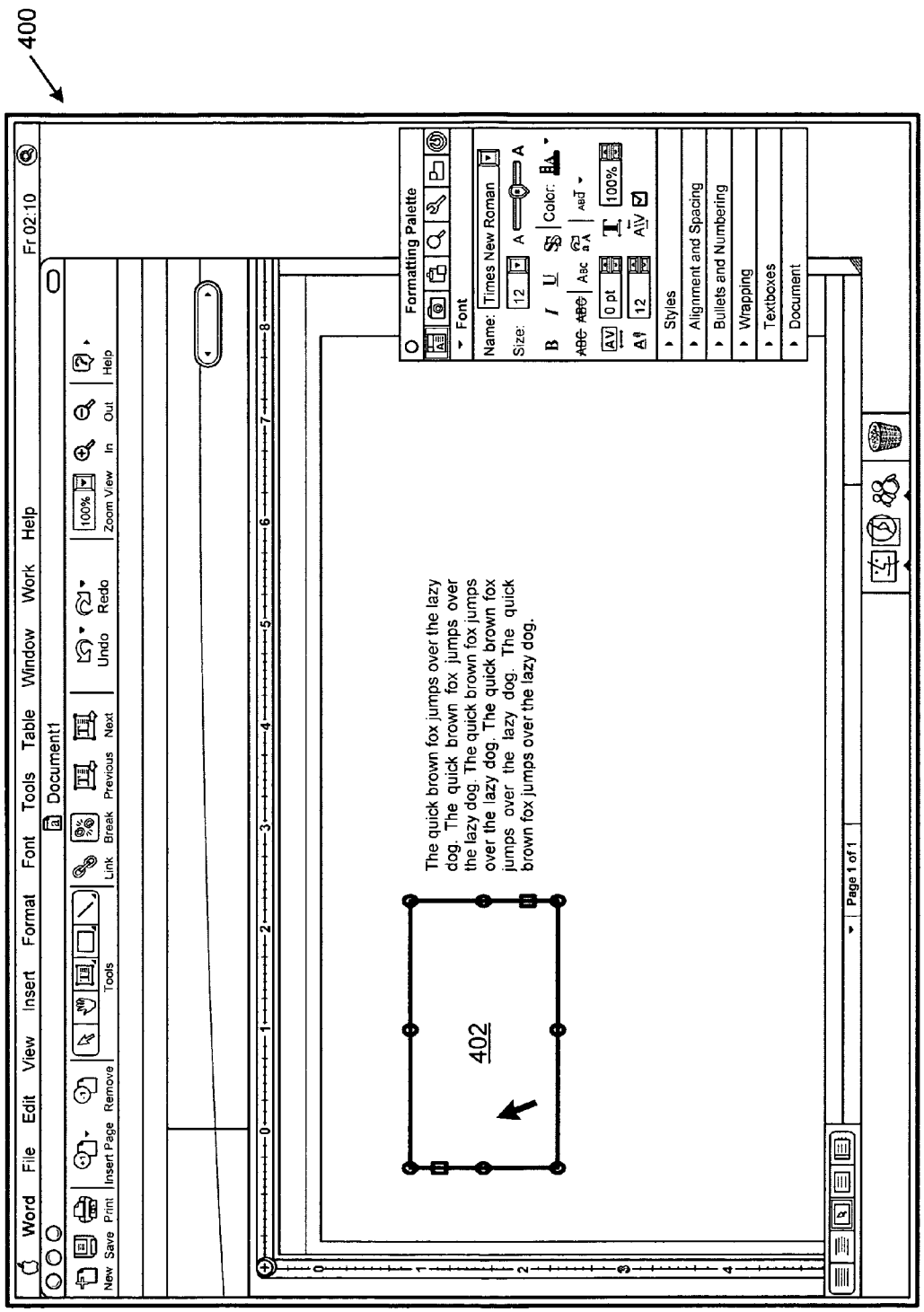

The embodiments of FIGS. 12-14 have the same three text boxes as FIG. 11, but the visual linking aid and sequence badge for a text box are visible only while the mouse hovers over that text box. Accordingly, in step 230 (FIG. 4), when the screen cursor is positioned over a text box, the visual linking aid assigned to that text box is displayed. The software checks whether the text box is a stand alone text box that is not linked to another text box in step 232. If the text box is a stand alone text box, only the visual linking aid, and not the sequence badge, is displayed. This is the example shown in FIG. 14. The software then returns to step 220 (FIG. 2A) to perform any further selected text box operations. In an alternative embodiment, even where a text box is a stand alone text box, its numeric indicator, e.g., "1," can be displayed in a sequence badge. Such an embodiment is shown for example in FIG. 16.

If a text box is instead part of a linked chain, the sequence badge may be visible on a mouse hover, such as shown in FIGS. 12 and 13. In embodiments, the sequence badge may only be displayed temporarily. Thus, the software may employ a sequence badge display countdown, which begins when a screen cursor initially enters over a text box. Upon expiration of the countdown, the badge is removed from the display. In embodiments, the countdown may be between one and three seconds, but the countdown may be longer or shorter than that in alternative embodiments.

In step 234, the software determines whether the sequence badge countdown has expired. If the screen cursor has just initially entered a text box, the countdown will not yet have expired. However, it is possible that the cursor is positioned over a text box for some time while other functions described above with respect to FIG. 2A are being performed (such as for example adding text to the text box). In such instances, the cursor may remain within a particular text box, and when the software of the present system again performs the steps shown in FIG. 5, step 234 prevents the sequence badge 410 from being displayed while the cursor remains within the text box.

Assuming the countdown has not yet expired (as for example where a cursor has just been positioned over a text box), the software of the present system displays the sequence badge for that text box somewhere on the text box in step 236. As indicated, the sequence badge will display the numeric indicator assigned to that text box to indicate the relative position of that text box in the linked chain of text boxes. In step 238, the software checks whether the countdown has expired. If so, the sequence badge is no longer displayed (step 240) and the software returns to step 220 in FIG. 2A to perform any further desired text box operations.

If a cursor is moved away from a text box, the countdown is reset so that the sequence badge will again be displayed if the cursor is again moved over that text box. Thus, in step 242, the system checks whether the mouse remains hovering over a text box. If so, the system loops through steps 236 and 238 of displaying the sequence badge and counting down the preset time period. If however the system determines the mouse is no longer positioned over a given text box, the sequence badge countdown for that text box is reset in step 244, the display of the sequence badge stops in step 240, and the system returns to step 220 in FIG. 2A to perform any further desired text box operations.

It is understood that in alternative embodiments, the sequence badge may remain displayed for as long as a cursor remains positioned over a text box and/or for as long as the visual linking aid for a text box is displayed. In such embodiments, the sequence badge countdown steps would be omitted.

Referring again to FIG. 2A, assuming no mouse click within a text box (step 220), mouse click on a border of a text box (step 224) or a mouse hover (step 228), the software may next check for a mouse click outside of a text box in step 250. By clicking outside of the text box 402 in step 250, the typing and format modes may be terminated and the text boxes may be displayed without the visual linking aids or sequence badges in step 252. A conventional black border may appear around the text box in step 224, or not, depending on user defined preferences. The system may then return to step 220 in FIG. 2A to perform any further desired text box operations.

Figure 5:
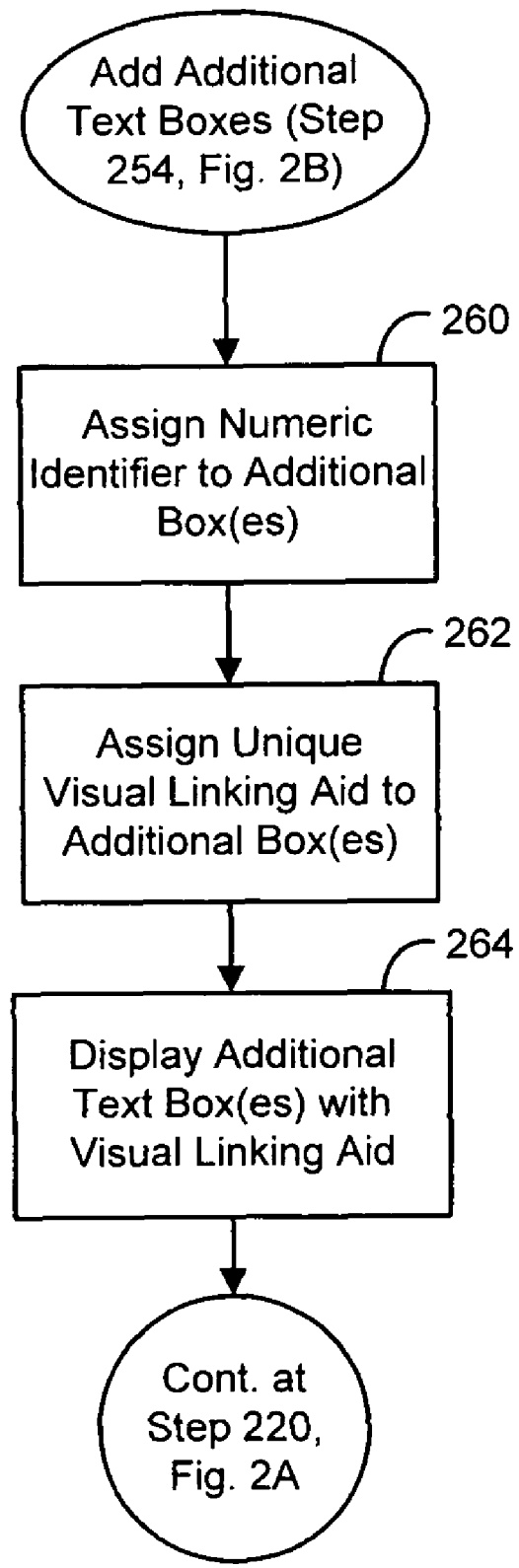
FIG. 5 is a flowchart for providing numeric indicators and visual aids when adding text boxes.

Another text box operation which may be performed is the addition of new text boxes. The ability to add text boxes to a GUI is known in the art. In accordance with an embodiment of the present system, when a text box is added (step 254, FIG. 2B), the system performs steps 260-264 as shown in FIG. 5. When additional text boxes are created on GUI 400, the software of the present system assigns each of the added text boxes a numeric identifier (step 260) and a visual linking aid which is different than others which may already be assigned to existing text boxes (step 262). The additional text boxes may be displayed on GUI 400 in step 264. As indicated above for the unlinked text boxes 402, 404 and 406 shown in FIG. 10, each may have a different visual aid. For example text box 402 may have a blue border, text box 404 may have a red border, and text box 406 may have a green border. The system may then return to step 220 in FIG. 2A to perform any further desired text box operations.

Figure 6:
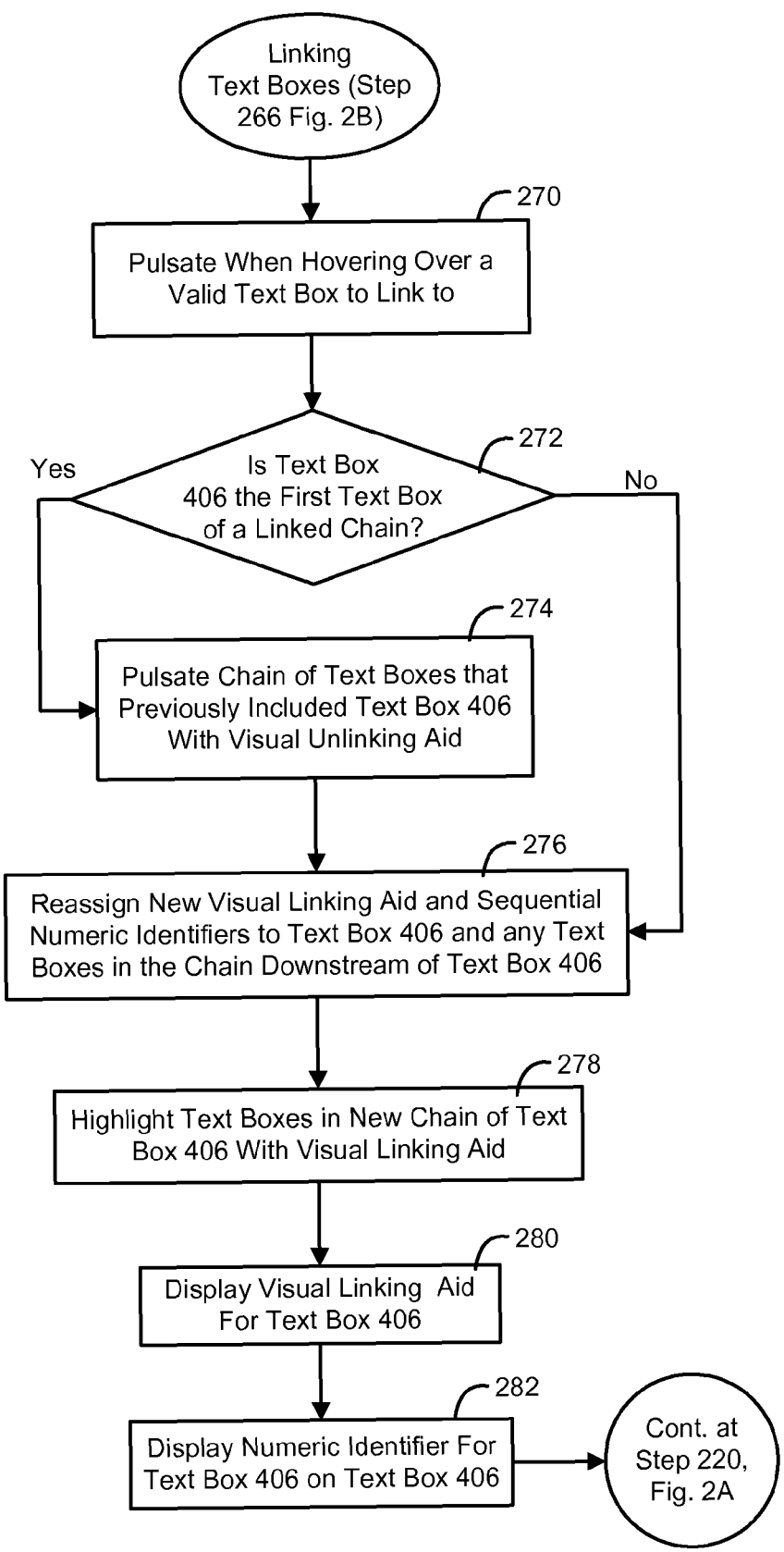
FIG. 6 is a flowchart for providing numeric indicators and visual aids to linked text boxes according to the present system.

Another text box operation which may be performed is the linking of text boxes to form a linked text box chain. The ability to link text boxes in a chain is known in the art. In accordance with an embodiment of the present system, when text boxes are linked (step 266, FIG. 2B), the system performs steps 270-282 as shown in FIG. 6 and the screen depiction shown in FIG. 11. In the illustrative embodiment of FIG. 11, text box 406 has been linked to text box 404. Text box 402 remains a stand alone text box.

When a text box linking operation is initiated, a user may select a first text box (e.g., text box 404) to which the user would like to link a second, target text box (e.g., text box 406). In accordance with principles of the present system, when moving the screen cursor around to select the target text box, text boxes which may validly link to the first text box may pulsate one or more times, or otherwise be highlighted, when the screen cursor hovers thereover in step 270. The pulsating gives an easy visual indication to the user that a text box is available for the linking operation. Once the target text box is selected, the linking of the first and second text boxes may be performed by the present system in a known manner.

In alternative embodiments, once a first text box (e.g., text box 404) is selected in the linking process, all available target text boxes (i.e., all text boxes to the first text box may be linked) may pulsate or otherwise be highlighted. In a further alternative embodiment, instead of, or in addition to, highlighting available target text boxes, all those text boxes that are not available for linking with the first text box may be dimmed.

In step 272, the software checks whether text box 406 to be linked is itself the second or later text box of an existing linked chain. If so, that previously existing chain is broken, and the broken chain is highlighted with a visual unlinking aid in step 274. The visual unlinking aid is explained in greater detail hereinafter.

However, if text box 406 is either a stand alone text box, or the first text box in a linked chain, the software of the present system performs step 276. In step 276, the software reassigns a new sequential numeric identifier to text box 406 and any other text box in the downstream chain in the event text box 406 is part of a linked chain. Text box 406 may be assigned the next sequential numeric identifier after the numeric identifier of text box 404. Thus for example if text box 404 were a stand alone text box prior to the linking operation, having a numeric identifier of "1," text box 406 may be assigned a numeric identifier of "2." Similarly, if text box 404 was the last text box in a chain of three linked text boxes prior to the linking operation involving text box 406, when text box 406 was linked to text box 404, text box 406 could be assigned a numeric indicator of "4."

Once text box 406 is linked to text box 404, text box 406, as well as any other text boxes in the downstream chain of text box 406, are changed to have the same visual linking aid as text box 404 in step 276. Thus, as an example, if prior to linking, text box 404 was red and text box 406 was green, both of text boxes 404 and 406 may be red after they are linked. It is understood that text box 404 may alternatively take on the visual linking aid of text box 406 after they are linked. As a further alternative, both the text boxes 404 and 406 may take on an entirely new visual linking aid after they are linked.

Upon formation, the chain including linked text boxes 404 and 406 may pulsate brightly one or more times in step 278 to indicate the formation of a new linked text box chain. The pulsating in step 278 may occur by a variety of methods including for example the visual linking aid flashing on and off, and/or glowing more brightly. The step 278 may additionally or alternatively involve the chain briefly changing color. Each of the text boxes in the new chain including text boxes 404 and 406 may pulsate at the same time, or the newly added text box(es) may pulsate after the upstream text boxes in the chain.

The newly formed text box chain may pulsate one to three times, or be highlighted as described above for a short period of time, such as for example, one to three seconds. It is understood that the newly formed text box chain may pulsate more than three times, or be highlighted for shorter or longer periods of time than one to three seconds in alternative embodiments.

After the pulsating stops, text boxes 404 and 406 may be displayed with the visual linking aid in step 280 in the event the screen cursor hovers over text box 404 or 406. In the event of a mouse hover, the sequence badge with numeric identifier may also be displayed in step 282.

Figure 15:
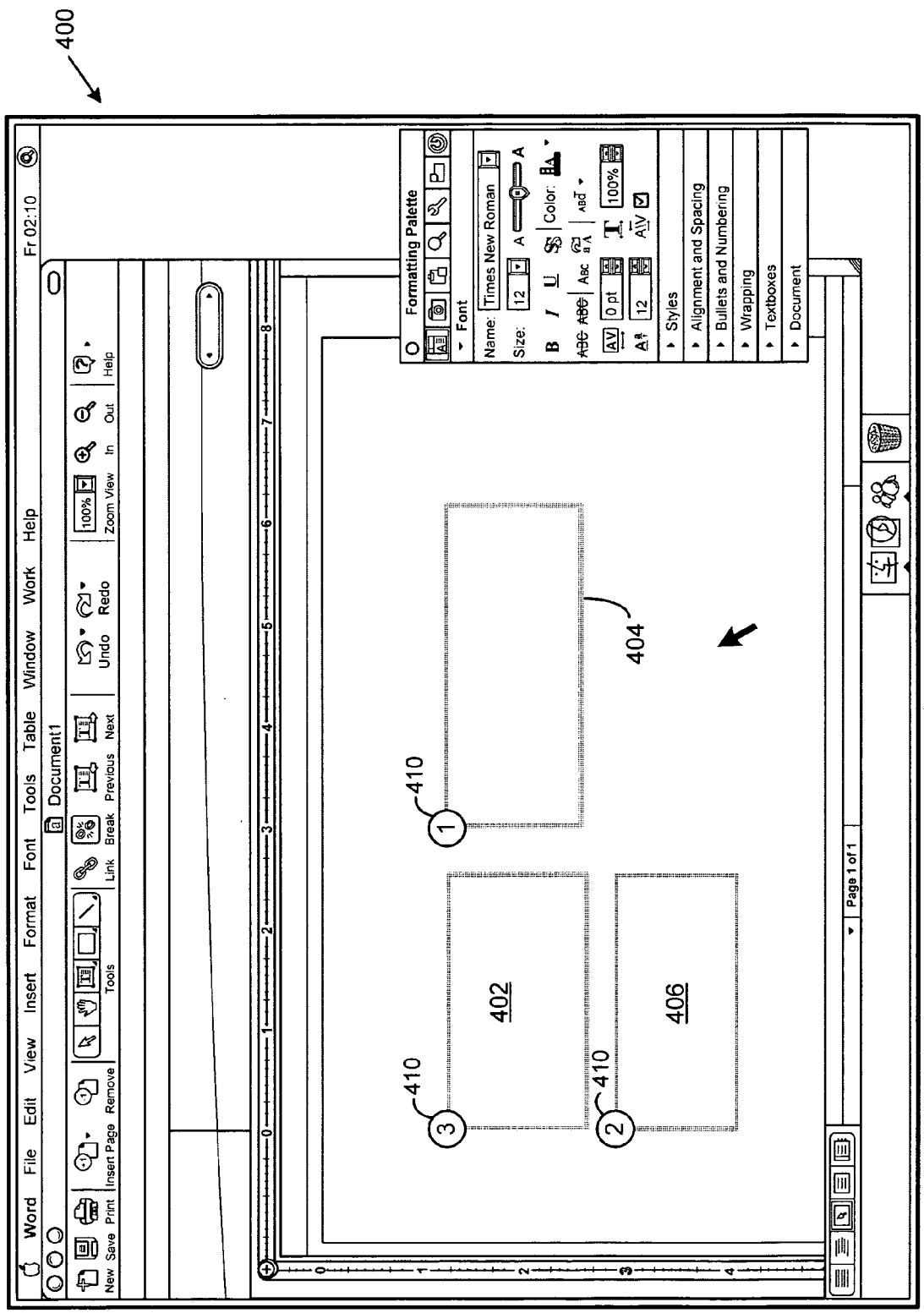

FIG. 15 is a further example of a linking operation in which text box 402 has been linked to text box 406. All text boxes in the chain would initially pulsate to show the formation of the new linked text box chain. The numeric identifier for text box 402 is reassigned to the next sequential numeric identifier in the chain (i.e., "3"), and the visual linking aid is reassigned to be the same as text boxes 404 and 406.

Figure 7:
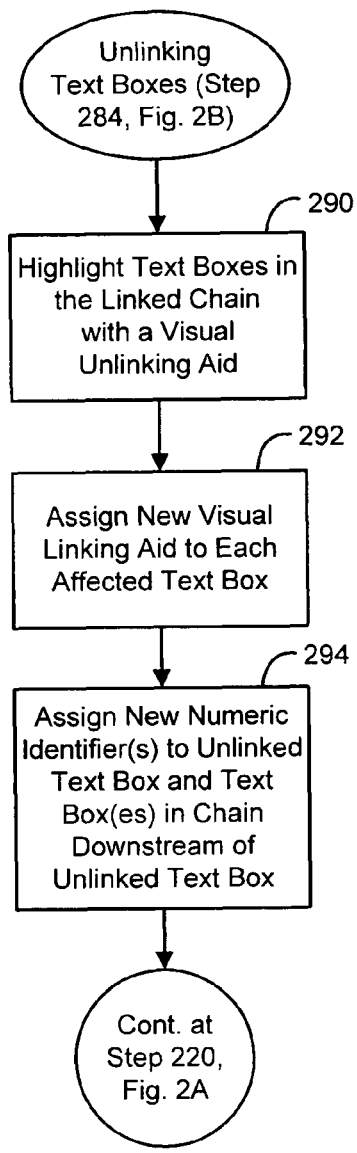
FIG. 7 is a flowchart for providing numeric indicators and visual aids to a linked text box chain when that chain is broken according to the present system.

Another text box operation which may be performed is the breaking of existing text box chains. The ability to break a text box chain is known in the art. In accordance with an embodiment of the present system, when a text box chain is broken (step 288, FIG. 2B), the system performs steps 290-294 as shown in FIG. 7 and the screen depiction of FIG. 16. Once a linked text box chain is broken, the entire chain may pulsate or be highlighted in some manner with a visual breaking aid in step 290. For example, the chain may pulsate one or more times in a color which is different than the visual linking aid color formerly associated with all text boxes in the former text box chain. The pulsating visual breaking aid may be the same color as the visual linking aid in alternative embodiments.

After a linked text box chain is broken, the system may reassign a unique visual linking aid to each text box that is now not part of the same linked chain after the break in step 292. In step 294, the system may also reassign sequential numeric identifiers to each text box affected by the break. In particular, all text boxes in the linked chain upstream of the break will be unaffected and maintain their visual linking aid and sequential numeric identifier(s). The text box at the break stands alone after the break and is reassigned a new visual linking aid and its own numeric identifier (e.g., "1"). Linked text boxes downstream of the break may remain linked at the break, but will be reassigned a new visual linking aid and sequential numeric identifiers with the first box in the downstream chain having a numeric identifier of for example "1."

Figure 16:
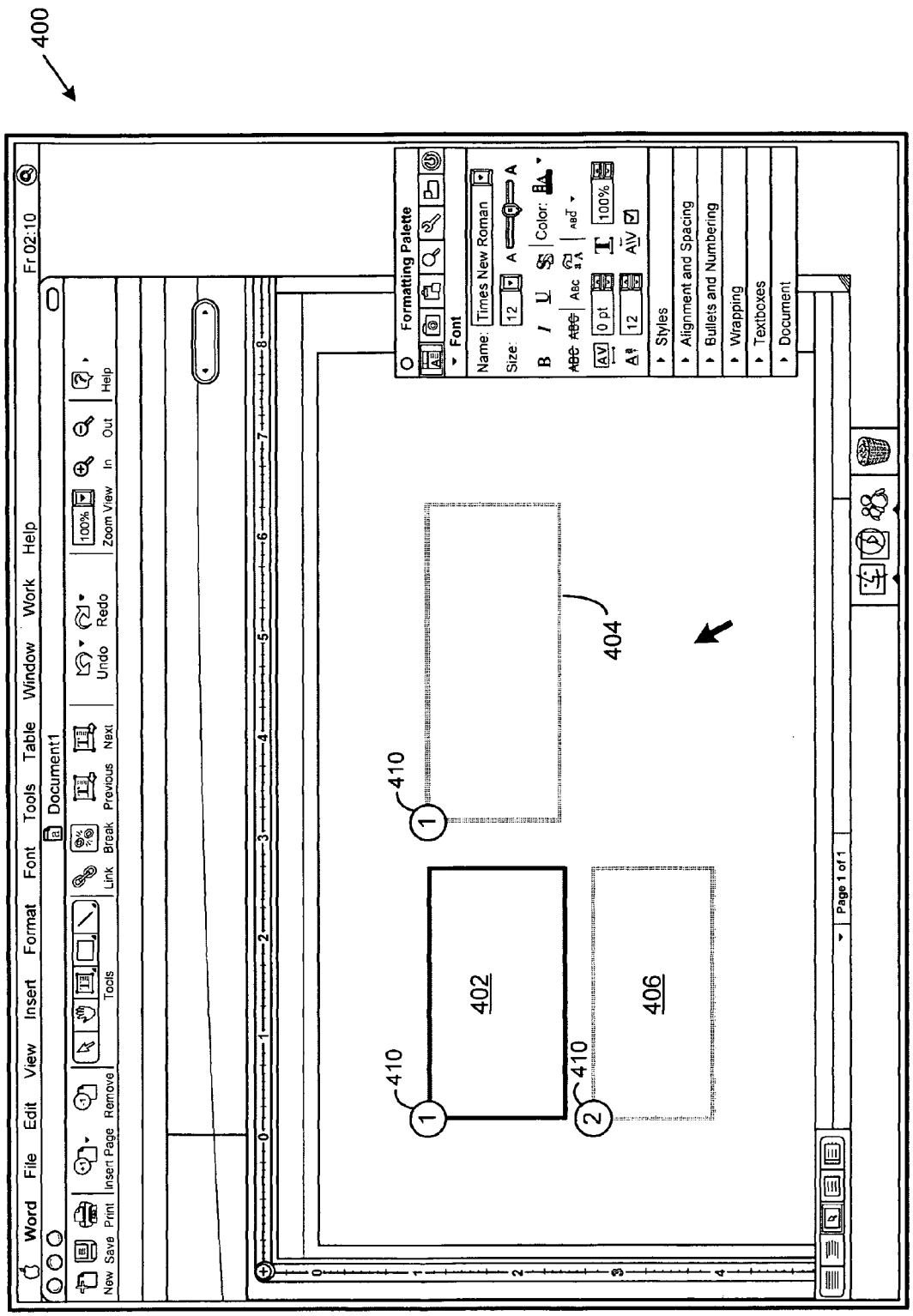

As an example, FIG. 15 shows three linked text boxes. FIG. 16 shows an example where text box 402 is broken from the chain of linked text boxes of FIG. 15. The former linked text box chain including all three text boxes would pulsate with the visual breaking aid to show the breaking of the chain. For example, if each of the text boxes prior to the break had a blue border, upon the break, the entire chain may pulsate one or more times in red. Thereafter, text boxes 404 and 406 maintain their visual linking aid and numeric identifiers. However, text box 402 is assigned a new visual linking aid and a new numeric identifier displayed in sequence badge 410.

Figure 2A:
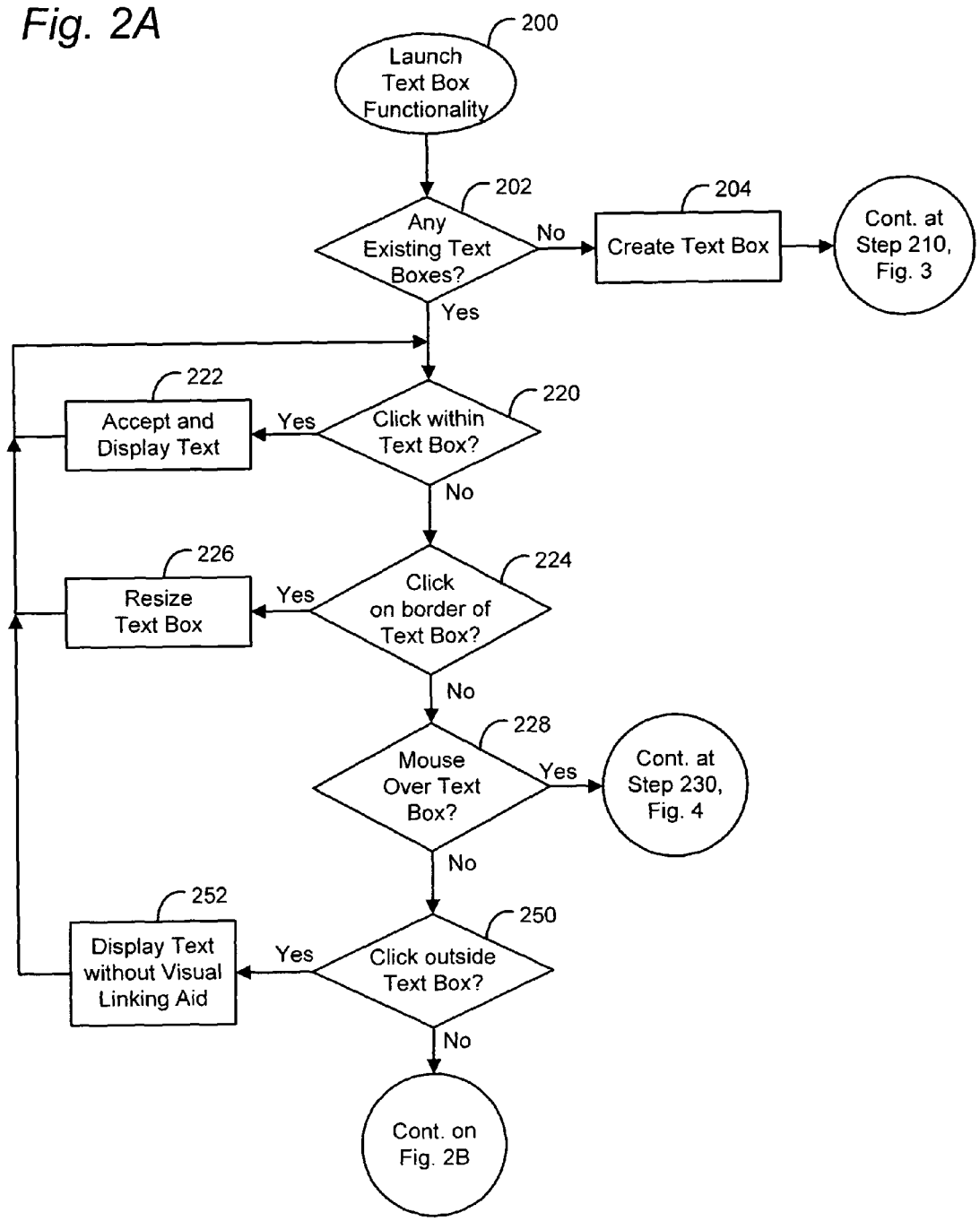
FIGS. 2A and 2B are a high level flowchart for performing various text box operations according to the present system.
Figure 2B:
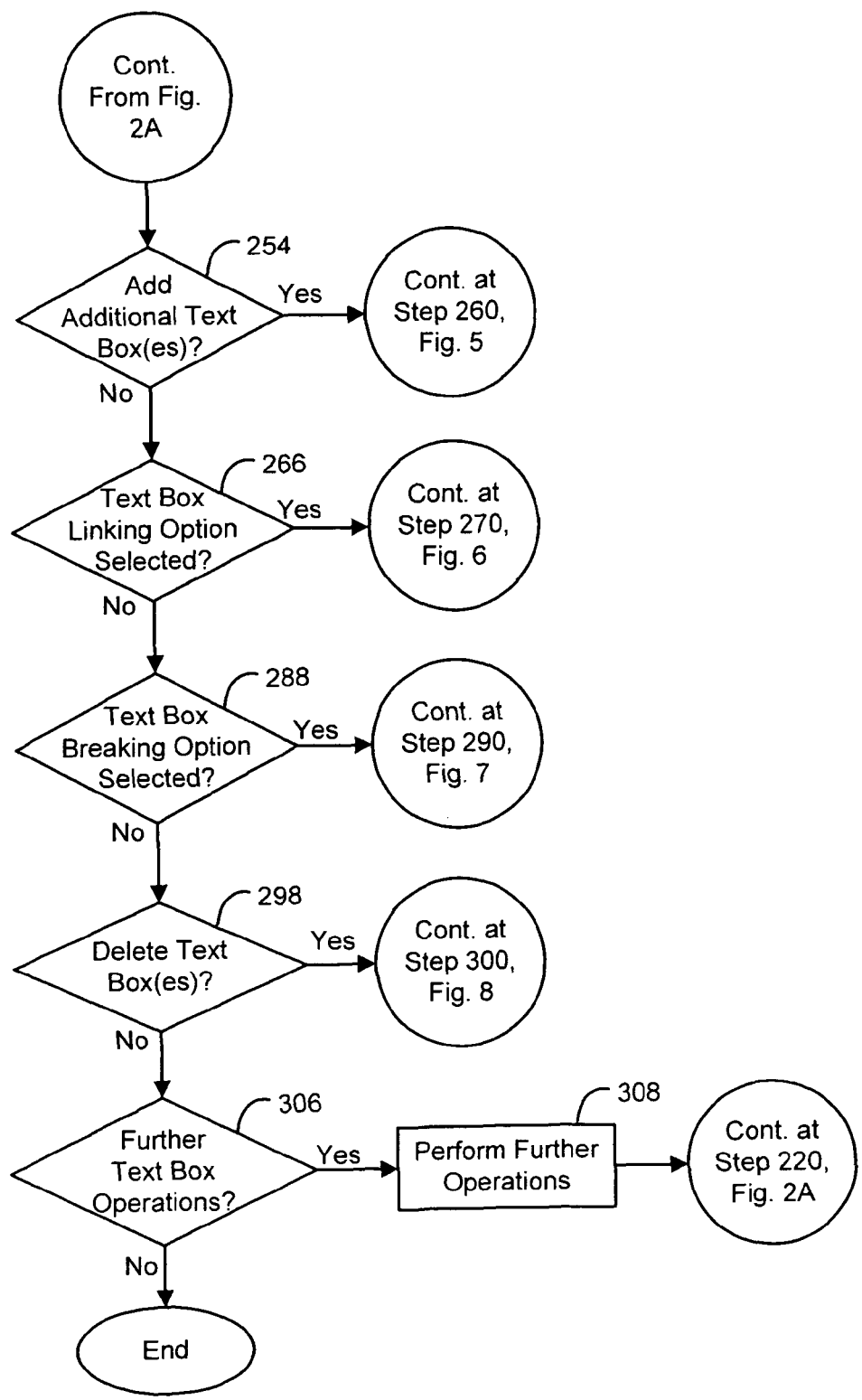
Figure 3:
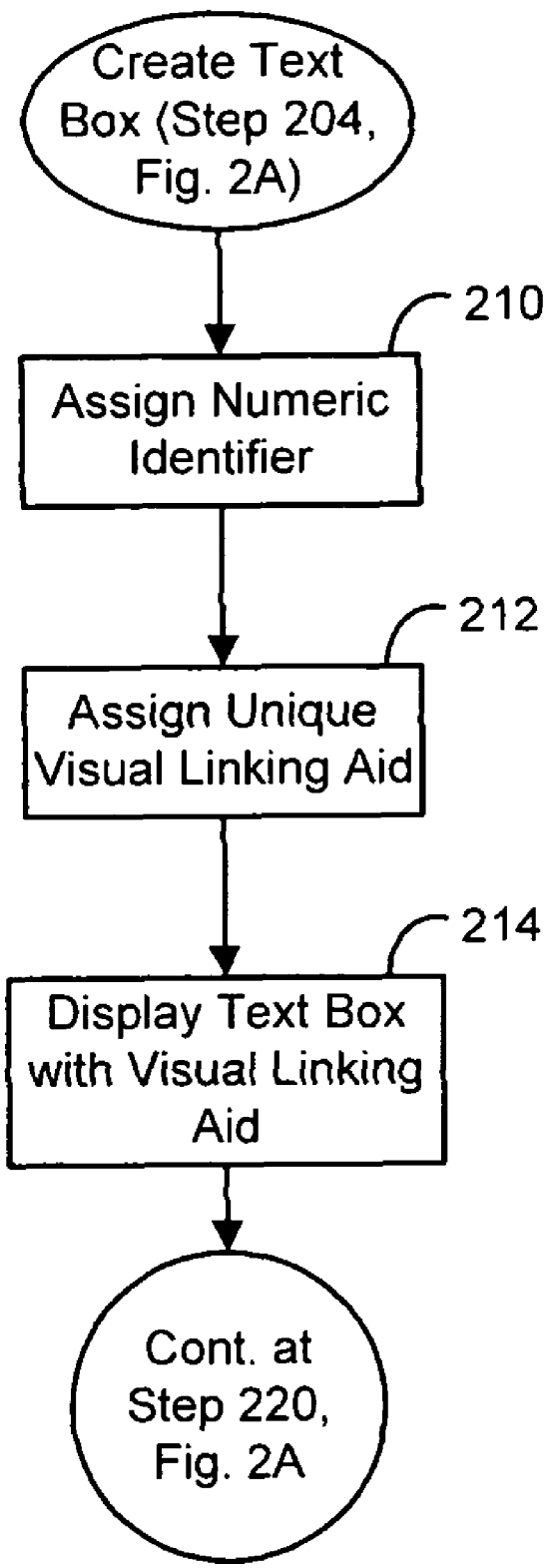
FIG. 3 is a flowchart for providing numeric indicators and visual aids when creating text boxes.
Figure 8:
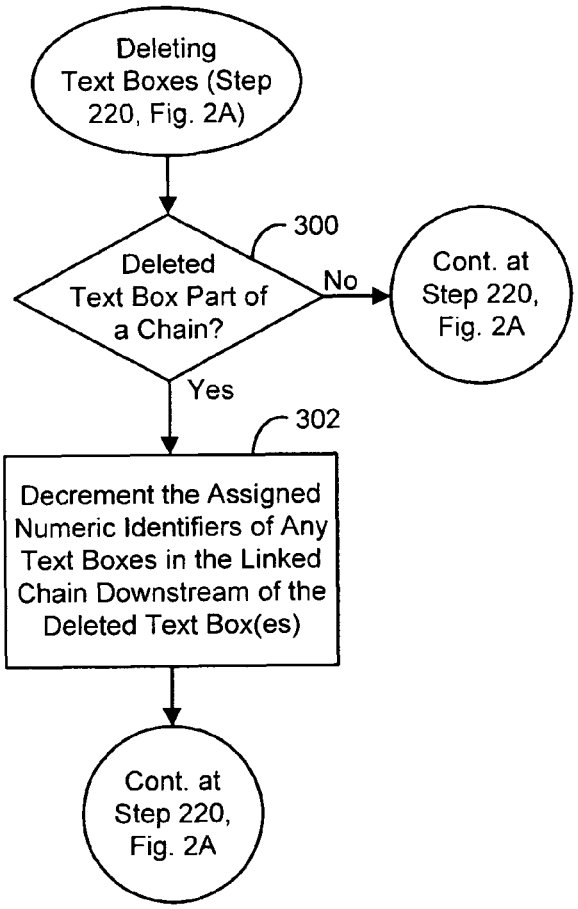
FIG. 8 is a flowchart for providing numeric sequence and visual aids when a text box is deleted according to the present system.
Figure 9:
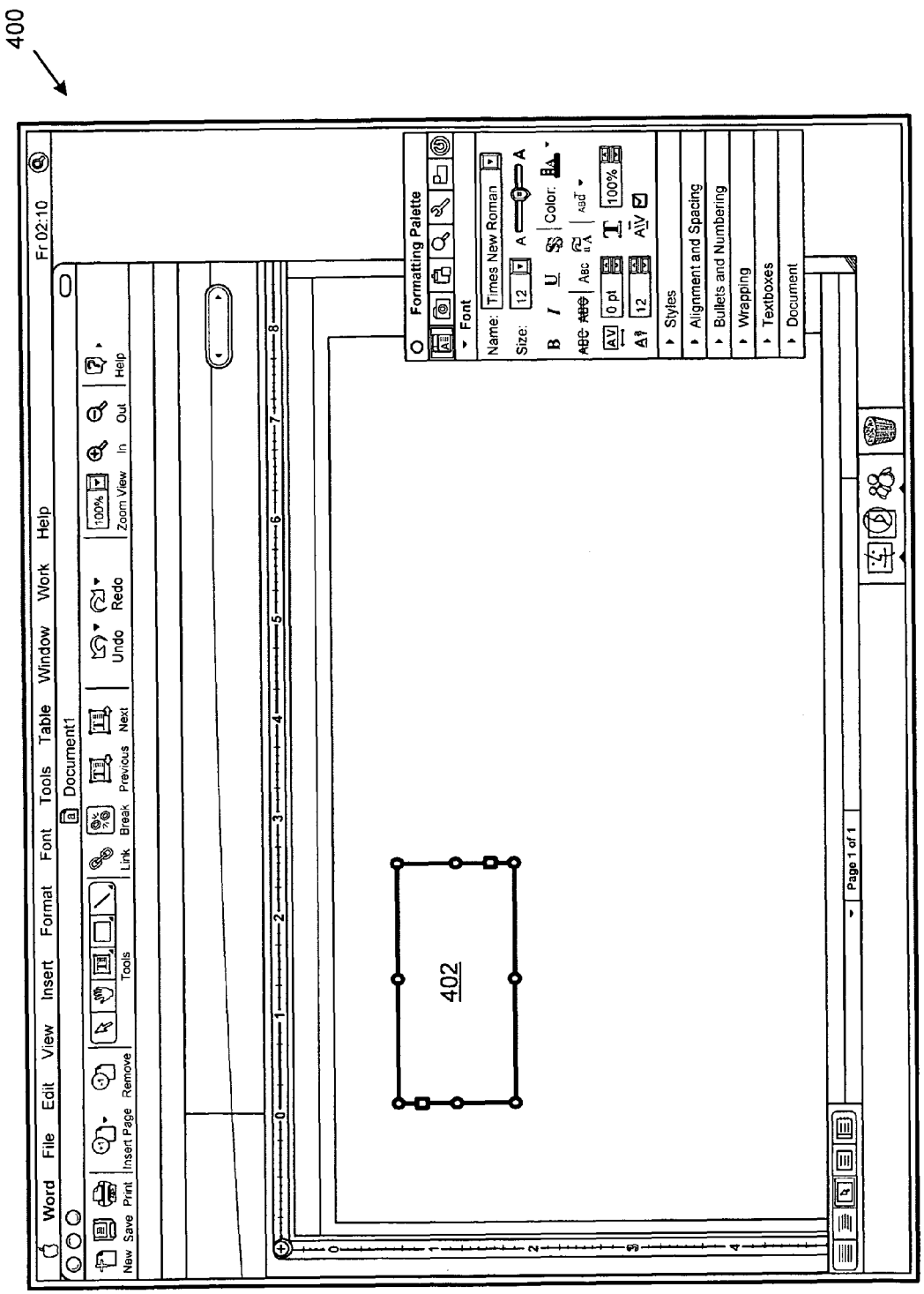
FIGS. 9-16 are sample screen depictions from a displayed graphical user interface according to the present system.

A user may also choose to perform the function of deleting a text box which is by itself or part of a chain (step 298, FIG. 2B). In such event, the system may perform steps 300 and 302 as shown in FIG. 8. In step 300, the system checks if a deleted text box was isolated or part of a chain. If isolated, nothing further need be done and the system may return to step 220 to perform other text box operations. On the other hand, if a deleted text box was part of a chain, in step 302, the system may decrement the assigned numeric identifiers of any text boxes in the linked chain downstream of the deleted text box(es). If a single text box were deleted, all downstream linked text boxes in that chain may have their numeric identifiers decreased by one. Alternatively, if three text boxes were deleted, all downstream linked text boxes may have their numeric identifier decreased by three.

In step 306, the system checks if there are any further text box operations the user would like to perform. If yes, the system performs those operations in step 308, which may be known in the art, and the system may then return to step 220 to perform any other text box operations. If there are no additional text box operations to be performed, the text box functionality may be closed, and the user may perform other application program functions or terminate the application program.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. In a computer system having a display and a user interface selection device, a method of providing a graphical user interface on the display, comprising the steps of:
   (a) generating a first chain of at least two related text box objects and generating a second chain of at least two related text box objects, the text box objects in the first chain being different than the text box objects in the second chain, the at least two text box objects in the first chain related to each other in that the two text box objects include a string of text, text from the string not fitting in the first text box object spilling over into the second text box object, the at least two text box objects in the second chain related to each other in that the two text box objects include a string of text, text from the string not fitting in the first text box object spilling over into the second text box object; and
   (b) displaying a first visual aid and a second visual aid in association with each of the text box objects in the first and second chains, the first visual aid including a color with each text box object in the first chain having a first, same color, and each text box object in the second chain having a second, same color, the first and second colors being different from each other, and the second visual aid including one of a number or letter in each of the at least two text box objects in the first and second chains, the numbers or letters in respective text box objects of the first chain ascending in consecutive order, the number or letter in each second visual aid indicating the order in which the text in the respective text box objects is to be read in the first chain, and the numbers or letters in respective text box objects of the second chain ascending in consecutive order, the number or letter in each second visual aid indicating the order in which the text in the respective text box objects is to be read in the second chain.

2. A method as recited in claim 1, wherein the step (b) of displaying at least one visual aid on the display indicating a relationship between the at least two text box objects comprises the step of displaying the text box objects with a colored border.

3. A method as recited in claim 2, wherein said step (b) of displaying the at least two text box objects with a colored border comprises the step of displaying the at least two text box objects with the same colored border when the at least two text box objects are linked to each other.

4. A method as recited in claim 2, wherein said step (b) of displaying the at least two text box objects with a colored border comprises the step of displaying the at least two text box objects with different colored borders when the at least two text box objects are not linked to each other.

5. A method as recited in claim 1, further comprising a step (c) of changing an appearance of the at least one visual aid on the display when the relationship between the at least two text box objects changes.

6. A method as recited in claim 5, wherein the step (c) of changing an appearance of the at least one visual aid comprises the step of changing a color of a border of a first text box object of the at least two text box objects after the first text box object is linked to a second text box object.

7. A method as recited in claim 5, wherein the step (c) of changing an appearance of the at least one visual aid comprises the step of changing a color of a border of a first text box object of the at least two text box objects after the first text box object is unlinked from a second text box object.

8. A method as recited in claim 5, wherein:
   the step (c) of changing an appearance of the at least one visual aid comprises the step of changing a number on a first text box object of the at least two text box objects when the relative position of the first text box object in the chain of linked text box objects changes.

9. A method as recited in claim 1, further comprising the step of only displaying the at least one visual aid when a screen cursor is positioned over the text box object by the user interface selection device.

10. A computer-storage medium having computer-executable instructions for programming a processor to perform a method of providing a graphical user interface on a display in a word processing software application, the method comprising:
   (a) generating a first chain of at least two related text box objects and generating a second chain of at least two related text box objects, the text box objects in the first chain being different than the text box objects in the second chain, the at least two text box objects in the first chain related to each other in that the two text box objects include a string of text, text from the string not fitting in the first text box object spilling over into the second text box object, the at least two text box objects in the second chain related to each other in that the two text box objects include a string of text, text from the string not fitting in the first text box object spilling over into the second text box object; and (b) displaying each text box object in the first and second chains with first and second visual aids in the text box object, the first visual aid including a color with each text box object in the first chain having a first, same color, and each text box object in the second chain having a second, same color, the first and second colors being different from each other, and the second visual aid including one of a number or letter in each of the at least two text box objects in the first and second chains, the numbers or letters in respective text box objects of the first chain ascending in consecutive order, the number or letter in each second visual aid indicating the order in which the text in the respective text box objects is to be read in the first chain, and the numbers or letters in respective text box objects of the second chain ascending in consecutive order, the number or letter in each second visual aid indicating the order in which the text in the respective text box objects is to be read in the second chain, and wherein the step of displaying each text box object further comprises the step of pulsating a display of at least a portion of the at least two text box objects in the first chain upon the at least two text box objects being linked in the first chain of linked text box objects, and wherein the step of displaying each text box object further comprises the step of pulsating a display of at least a portion of the at least two text box objects in the second chain upon the at least two text box objects being linked in the second chain of linked text box objects.

11. A computer-storage medium having computer-executable instructions for programming a processor to perform a method as recited in claim 10, wherein said step of displaying the at least one visual aid on the display associated with a text box object comprises the step of displaying the text box object in a color in which the text box objects in the group of two or more linked text box objects are displayed.

12. A computer-storage medium having computer-executable instructions for programming a processor to perform a method as recited in claim 10, further comprising the step of changing the color of the text box object and sequential indicator when the text box object is unlinked from the group of two or more text box objects.

13. A computer-storage medium having computer-executable instructions for programming a processor to perform a method as recited in claim 10, further comprising the step of only displaying the color of the text box object and the sequential indicator of the text box object when a screen cursor is positioned over the text box object by the user interface selection device.

\* \* \* \* \*